July 1, 1958
M. L. JACOBS ET AL
2,841,042
ADJUSTABLE CENTER FOR LATHES
Filed Aug. 2, 1955
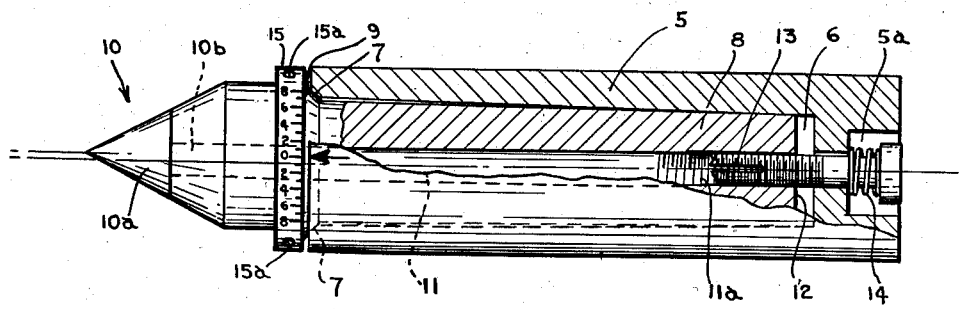
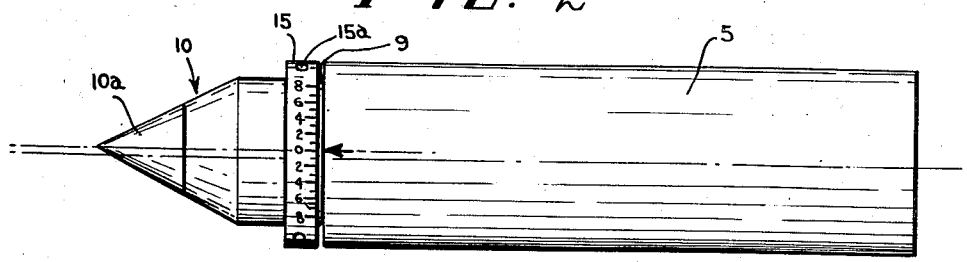
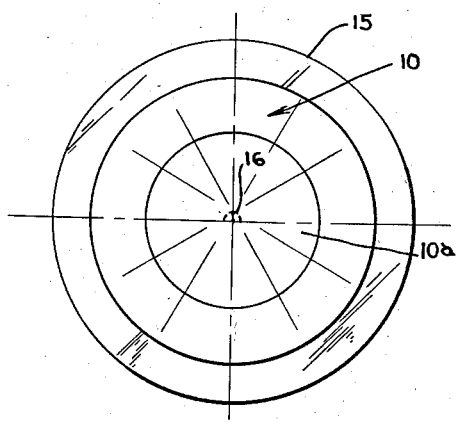
INVENTORS
MARCELLUS L. JACOBS
JOSEPH H. JACOBS
BY
Williamson, Schroeder, Adams & Meyers
ATTORNEYS

United States Patent Office 2,841,042
Patented July 1, 1958

2,841,042

ADJUSTABLE CENTER FOR LATHES

Marcellus L. Jacobs, Excelsior, and Joseph H. Jacobs, Osseo, Minn., assignors to Jacobs Wind Electric Company, Minneapolis, Minn., a corporation of Montana Application August 2, 1955, Serial No. 526,018

3 Claims. (Cl. 82—33)

This invention relates generally to adjustable lathe centers and is an improvement over the copending application, Serial No. 327,121, filed December 20, 1952 invented by Joseph H. Jacobs.

While the adjustable center disclosed and claimed in said above identified copending application has worked very satisfactorily, the construction thereof has been somewhat more expensive than anticipated and there has been some problem incurred with the tapered shank binding within the tapered socket of the mounting member and thus resisting adjustable turning of one member within the other.

It is an object of our present invention to provide an adjustable lathe center specifically constructed to prevent binding of the tapered shank within the mounting member and to provide a simplified means for holding said shank in positively seated relation within said socket.

It is still another object to provide a novel and inexpensive yet highly efficient and accurate adjustable lathe center whereby said center may be adjusted to accurately position one end of the work held in the lathe.

These and other objects and advantages of my invention will more fully appear from the following description made in connection with the accompanying drawings wherein like reference characters refer to the same or similar parts throughout the several views, and in which:

Fig. 1 is a side elevational view of our improved lathe center with a portion thereof broken away to show in vertical section;

Fig. 2 is a side elevational view of the center shown in Fig. 1 and showing the relationship of the center lines of the shank and point; and Fig. 3 is an end elevational view showing the adjustment path of the point by dotted lines.

As illustrated in the accompanying drawings we show a mounting member 5 having a tapered hollow portion forming a shank receiving socket 6. The forward open end of the socket 6 has a sharply tapered annular shoulder 7. A tapered shank member 8 having a more gradual taper than the taper of the socket is received within said socket 6 and has a sharply tapered shoulder 9 which engages the annular shoulder 7 to form a positive stop and bearing surface for the shank member. The axis of the shank 8 including the shoulder 9 is concentric with the axis of the socket 6 including the shoulder 7.

A tapered point 10 is formed on the forward end of the shank 8 and is eccentrically ground with respect to the concentric axes of shank 8 and socket 6. In the form shown the point portion 10 of the lathe center has a hardened insert 10a removably mounted therein and securely anchored in operative position by a tightly pressed rearwardly extending portion 10b thereof. The shank 8 has an axially disposed hollow passage 11 extending therethrough to permit said hardened tip 10a to be driven out and changed when necessary.

The rear portion 11a of the hollow passage 11 is internally threaded and a retaining screw 12 is threadably received therein. Suitable means for holding the screw 12 against rotation relative to the shank 8 are provided such as by splitting the forward portion of said screw 12 as at 13 and spreading said split portions to provide a tight binding fit within the threaded portion 11a of the passage 11 through said shank. The rear portion of the hollow body member has a recess 5a formed therein with an aperture extending inwardly therefrom through which the screw 12 passes with sufficient clearance to permit free rotation thereof. A compression spring 14 is interposed between the head of the screw and the inner end of recess 5a to resiliently hold the shank 8 in operative position with the tapered shoulders 7 and 9 in engagement. The rear portion of the shank 8 and the inner portion of the socket 6 closely fit together to positively hold said shank 8 against lateral shifting movement within the mounting member 5. Obviously the frictional resistance to rotation between the screw 12 and the shank 8 is greater than between the screw 12 and the rear portion of the mounting member 5.

The operation of our new improved adjustable lathe center as disclosed herein is substantially similar to the prior Jacobs adjustable lathe center disclosed in the previously herein identified copending application for patent. The shank portion 8 has an enlarged boss 15 formed on the forward portion thereof adjacent the forward edge of sharply tapered shoulder 9 and a pair of rod receiving apertures 15a are provided therein to receive a torque producing rod and permit adjustable rotation between the shank 8 and the mounting member 5 which, of course, produces adjustable rotation of the eccentrically formed point 10 to laterally adjust the position thereof as shown in Fig. 3. The small arc 16 of Fig. 3 shows the extreme end of point 10 during relative rotation of shank 8 within mounting member 5. The graduations on the scale provided on the boss 15 are such as to permit the actual lateral adjustment of the extreme tip end of the point 10 to be read directly in thousandths of an inch. The sharply tapered stop portions or shoulders 7 and 9 of the mounting member and the shank respectively are so positioned with respect to the gradually tapered portions thereof that at least the inner ends of said gradually tapered portions securely interfit to anchor said shank within said mounting member and prevent inadvertent rotation thereof during operation of the lathe. The spring 14 constantly urges said two members together and the sharply tapered shoulders 7 and 9 prevent excessive binding between the gradually tapered portions of the two parts 5 and 8, thus facilitating controlled rotational adjustment between the parts and also facilitating separation of the parts if necessary.

It will, of course, be understood that various changes may be made in the form, details, arrangement, and proportions of the parts without departing from the scope of my invention which generally stated consists in the matter set forth in the appended claims.

What is claimed is:

1. An adjustable lathe center comprising a center point member having an elongated rearwardly extending shank with a gradually tapered portion and having a forwardly extending work-mounting tip with the point thereof disposed eccentrically of the longitudinal axis of said tapered shank portions, and having an enlargement extending radially outwardly between said gradually tapered portions and the work-mounting tip, said enlargement having a sharply tapered portion on the rear side thereof, a mounting member having a hollow portion with cooperating gradually tapered portions for cooperatively receiving in concentric relation the gradually tapered shank portions of the center point member to frictionally engage the same and hold said shank against rotation during operative rotation of work on said work-mounting tip, the forward end of said hollow portion terminating in a cooperating sharply tapered portion to engage the sharply tapered enlarged portion of the center point member when the gradually tapered portions are frictionally interfitted with the desired frictional resistance to rotation, and means associated with the rear portions of said shank and said mounting member to hold said sharply tapered portions in engagement and thus maintain the desired predetermined resistance to relative rotation between the shank and mounting member.

2. The structure set forth in claim 1 and said means for holding said shank and said mounting member in interfitted relation comprising a screw member extending through the rear portion of said mounting member and securely anchored at its forward end to said shank and having abutment means at its rear end for engaging the rear portion of said mounting member.

3. The structure set forth in claim 2 and a resilient member interposed between said abutment and said mounting member to exert a resilient rearwardly directed force on said shank.

References Cited in the file of this patent

UNITED STATES PATENTS

| | | |
|---|---|---|
| 1,338,451 | Hoover | Apr. 27, 1920 |
| 2,006,801 | Gibbs | July 2, 1935 |
| 2,077,293 | Weaver | Apr. 13, 1937 |
| 2,091,469 | Chace | Aug. 31, 1937 |
| 2,463,385 | Holohan | Mar. 1, 1949 |
| 2,486,044 | Lusk | Oct. 25, 1949 |
| 2,490,117 | Davis | Dec. 6, 1949 |
| 2,531,809 | Fish | Nov. 28, 1950 |
| 2,547,858 | Dearborn | Apr. 3, 1951 |
| 2,780,467 | Jackson | Feb. 5, 1957 |

FOREIGN PATENTS

| | | |
|---|---|---|
| 70,820 | Norway | Aug. 5, 1946 |
| 495,058 | France | June 15, 1919 |
| 915,404 | Germany | July 22, 1954 |
| 1,052,332 | France | Sept. 23, 1953 |

OTHER REFERENCES

American Machinist, April 15, 1915, vol. 42, No. 15, page 646.

American Machinist, June 5, 1924, vol. 60, No. 23, page 858.